United States Patent [19]
Podd et al.

[11] Patent Number: 5,454,685
[45] Date of Patent: Oct. 3, 1995

[54] CONVEYOR SHEET CARGO CONTAINER

[76] Inventors: Victor I. Podd, Jr.; Stephen D. Podd, both of 225 Beverly Avenue, Montreal, Quebec, Canada

[21] Appl. No.: 173,704

[22] Filed: Dec. 23, 1993

Related U.S. Application Data

[63] Continuation of Ser. No. 732,451, Jul. 18, 1991, abandoned.

[51] Int. Cl.⁶ .................................................. B60P 1/00
[52] U.S. Cl. ..................... 414/527; 298/1 B; 414/467; 414/539; 220/403; 410/129; 242/390
[58] Field of Search ..................................... 414/467, 416, 414/417, 527, 528, 539; 298/1 R, 1 B; 242/390, 590; 220/729, 1.5, 403, 65; 410/119, 121–152; 105/369

[56] References Cited

U.S. PATENT DOCUMENTS

| | | |
|---|---|---|
| 2,477,707 | 8/1949 | Walz ............................ 414/527 |
| 2,595,395 | 5/1962 | Lavelle et al. .................. 414/527 |
| 2,764,304 | 9/1956 | Johnson, Jr. ................. 414/527 X |
| 2,895,431 | 7/1959 | Ford . |
| 2,949,866 | 8/1960 | Ford . |
| 2,989,011 | 6/1961 | Henrikson . |
| 3,164,395 | 1/1965 | Burch et al. . |
| 3,297,175 | 1/1967 | Gooding . |
| 3,427,997 | 2/1969 | Brown et al. ..................... 105/369 |
| 3,443,703 | 5/1969 | Matsumoto . |
| 3,696,952 | 10/1972 | Bondenheimer ................. 220/65 |
| 3,868,042 | 2/1975 | Bodenheimer . |
| 3,886,544 | 2/1975 | Rothell . |
| 3,978,996 | 9/1976 | Oltrogge . |
| 4,124,136 | 11/1978 | Bjelland et al. . |
| 4,168,667 | 9/1979 | Loomis . |
| 4,265,577 | 5/1981 | Loomis . |
| 4,277,220 | 7/1981 | Wiley . |
| 4,405,089 | 9/1983 | Taylor . |
| 4,436,466 | 3/1984 | Marino . |
| 4,470,749 | 9/1984 | Koudstaal . |
| 4,556,349 | 12/1985 | Koudstaal et al. . |
| 4,629,390 | 12/1986 | Burke . |
| 4,749,325 | 6/1988 | Hodgetts . |
| 4,773,802 | 9/1988 | Rewis . |
| 4,781,498 | 11/1988 | Cox . |
| 4,784,287 | 11/1988 | Yamada et al. .................... 220/403 |
| 4,842,471 | 6/1989 | Hodgetts . |
| 4,892,456 | 1/1990 | Hodgetts . |
| 4,948,325 | 8/1990 | Hodgetts . |
| 5,244,332 | 9/1993 | Krein et al. ..................... 414/467 |

FOREIGN PATENT DOCUMENTS

| | | | |
|---|---|---|---|
| 1205106 | 5/1986 | Canada ......................... | 298/1 R |

*Primary Examiner*—Frank E. Werner
*Attorney, Agent, or Firm*—Randall L. Reed

[57] ABSTRACT

Unloading Apparatus for Use with a Cargo Container. The cargo container defines an interior cargo space and has a floor, left and right side walls, a front wall between the left and right side walls at the end of the floor and an opening at another end of the floor opposite the front wall. A liner is placed over the floor and extends from at least the front wall to the back opening. The unloading apparatus attaches to the cargo container at the back opening and has a frame with twist locks on it to connect into openings in the back of the container. The frame also has an mandrel rotatably supported by it and laterally extending from the left side to the right side of the frame. The mandrel includes a device for attaching the edge of the liner adjacent the back opening of the container to the mandrel. A drive device is mounted on the frame which engages the mandrel and rotates it so that the liner winds onto the mandrel as it rotates. As the liner winds onto the mandrel, the cargo previously deposited on the liner in the container spills out the back opening. Thus, the cargo in the container is unloaded through the back opening of the container.

12 Claims, 6 Drawing Sheets

CONVEYOR SHEET CARGO CONTAINER

This application is a continuation of application Ser. No. 07/732,451, filed on Jul. 18, 1991, now abandoned.

BACKGROUND OF THE INVENTION

This invention generally relates to cargo containers; and more specifically, to cargo containers of the type from which bulk cargo is discharged by pulling a bottom or floor liner out from the container.

Standardized containers or boxes have come into very extensive use for the shipment of freight by land and sea, and the many advantages of such intermodal containers have made it very desirable to adapt them for use with as many types of cargo as possible. Accordingly, there have been attempts, with varying degrees of success, to use such standardized containers to carry bulk cargo such as dry bulk chemicals, powdered and pelletized resins, flour, coffee beans, and grains. In particular, considerable attention has been given over the last several years to transporting such cargo in bulk in standardized intermodal cargo containers—that is, in containers in which the cargo is loaded, unwrapped, and unpackaged directly into containers, without first loading or packing the cargo in smaller boxes or packages and then loading those smaller boxes or packages into the intermodal containers.

Commonly, when a cargo is transported in bulk in a large, intermodal container, the cargo is discharged from the container by tilting the container so that the cargo slides out the back of the container under the force of gravity. While this cargo discharging method has received significant commercial acceptance, it has a disadvantage in that it requires an expensive apparatus to tilt the container.

With another method for discharging bulk cargo from a cargo container, a pleated liner is first placed on the container floor when the container is empty, and then the cargo is loaded into the container, over the liner. To discharge the cargo from the container, the liner is pulled out from the cargo container, pulling the product out from the container with the liner. This cargo discharging procedure has not received widespread commercial use, however. A primary reason for the lack of commercial use is that, heretofore, the industry has not been able to provide a discharging method of this general type that, on the one hand, effectively unloads the entire contents of the cargo container, and on the other hand, is still comparatively simple and economically acceptable.

SUMMARY OF THE INVENTION

An object of this invention is to improve methods and apparatus for discharging bulk cargos from cargo containers.

Another object of the present invention is to provide an economical and effective method for discharging bulk cargo from a cargo container, of the type in which a bottom liner is pulled out from the cargo container to pull the cargo out therefrom.

A further object of this invention is to provide an improved liner for lining the bottom of a bulk cargo container, and that facilitates completely unloading the cargo from the container when the liner is pulled out from the container.

A still another object of this invention is to provide a system for securing a bulkhead inside a bulk cargo container, that eliminates the need to use the floor or a bottom portion of the cargo container to support the bulkhead.

An object of the present invention is to suspend a bulkhead inside a cargo container so that an entire bottom section of the bulkhead can be removed, to allow cargo to be discharged from the cargo container without interfering with the way in which the bulkhead is supported inside the cargo container.

A further object of this invention is to pull a liner out from a bulk cargo container by winding the liner onto a mechanism that is mounted and locked directly onto the cargo container.

Another object of the present invention is to provide a mechanism for pulling a liner from a bulk cargo container, that can be easily mounted and locked directly onto standard size intermodal cargo containers.

A still further object of this invention is to provide a mechanism to pull a liner from a cargo container, and that is very simple and economical to manufacture, install, and operate.

These and other objectives are attained with a cargo container comprising a container body, a floor liner, and a rear bulkhead. The container body defines an interior cargo space for holding a cargo, and a back opening for conducting cargo into and discharging cargo from that cargo space. The liner is positioned on the container floor in a sequence of overlapping pleats or with a series of spaced rolls that allow the length of the liner to expand. The bulkhead is held inside the container body, immediately forward of a back wall thereof, to hold the cargo in the cargo space. In particular, the bulkhead is suspended inside the cargo container—that is, the bulkhead is not significantly supported by the floor of the container, but instead is supported by the sides, the roof, or by both the sides and the roof of the container.

To unload cargo from the container, an opening is formed in the bottom of the bulkhead, and the liner is pulled out from the cargo container. As the liner is so pulled, cargo is pulled out with the liner; and at the same time, the pleats or rolls of the liner unfold and unroll, expanding the length of the liner. The dimensions of the liner, particularly the size and number of pleats or rolls, are selected so that the liner is able to pull out substantially all of the cargo from the container as the liner itself is pulled out of the cargo container.

Preferably, a mechanical apparatus is directly mounted on the cargo container to pull the liner out therefrom; and this pulling apparatus comprises a frame, a mandrel, drive means, and connecting means. The mandrel is rotatably supported by and laterally extends across the frame of the pulling apparatus, and the mandrel includes means to connect the floor liner of the cargo container to the mandrel. The drive means of the pulling apparatus is mounted on the frame and engages the mandrel to rotate the mandrel and wind the container floor liner therearound. The connecting means of the pulling apparatus is mounted on the frame to connect the pulling apparatus to the cargo container, preferably immediately rearward of and below the bottom edge of the back opening of the cargo container.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
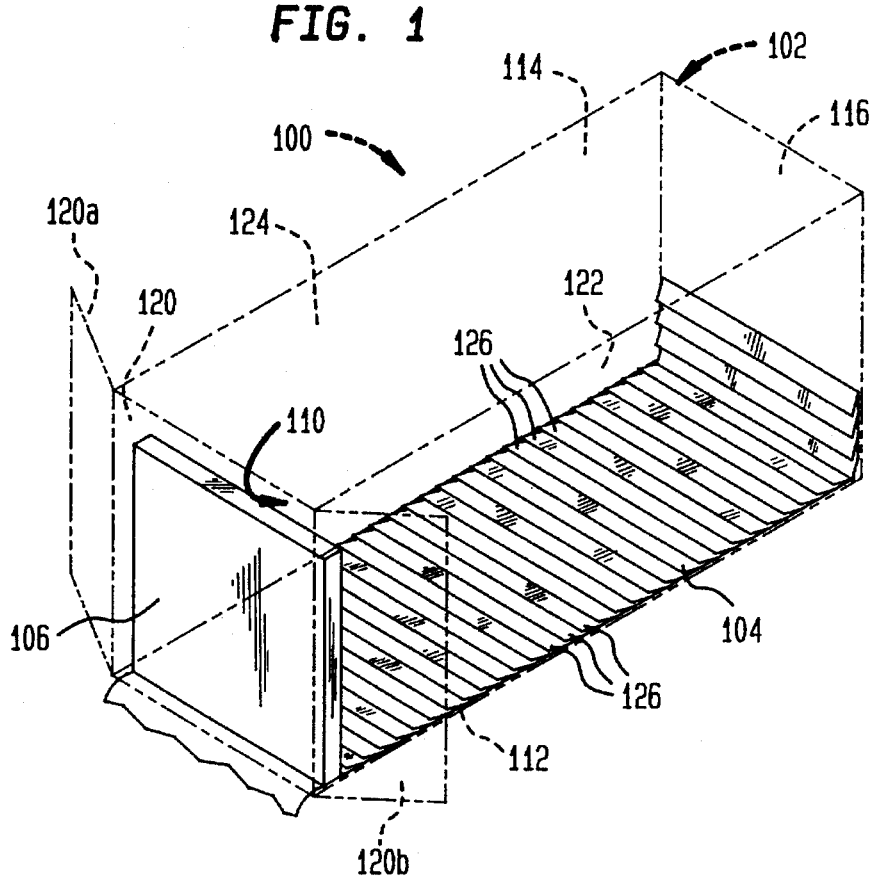
FIG. 1 shows a bulk cargo container.
Figure 2:
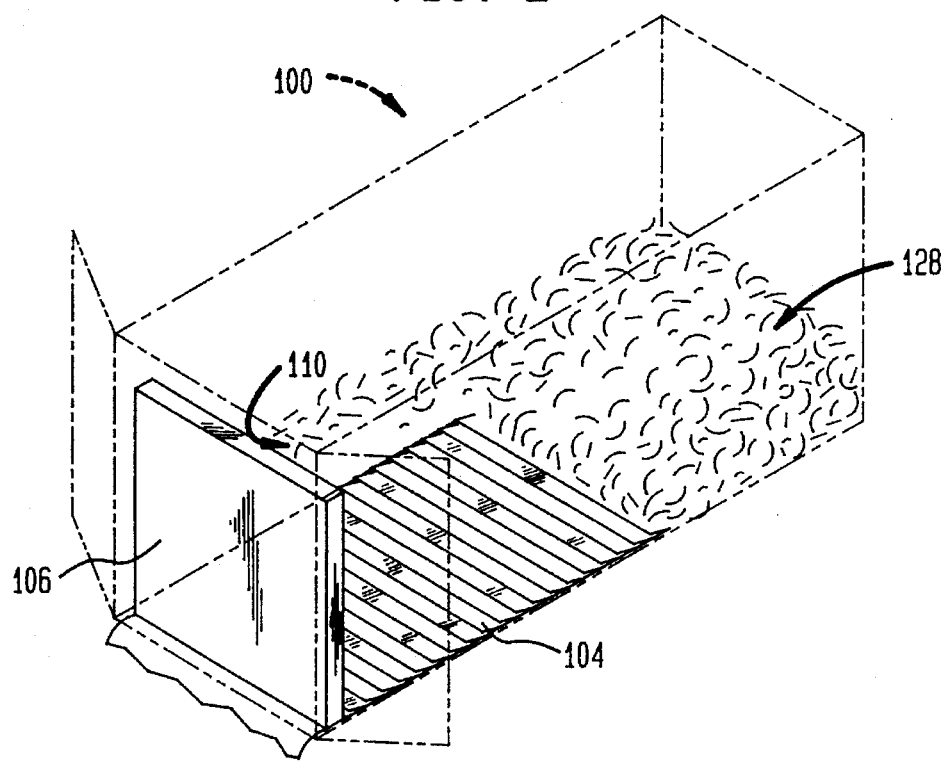
FIG. 2 illustrates a cargo being loaded into the container of FIG. 1.
Figure 3:
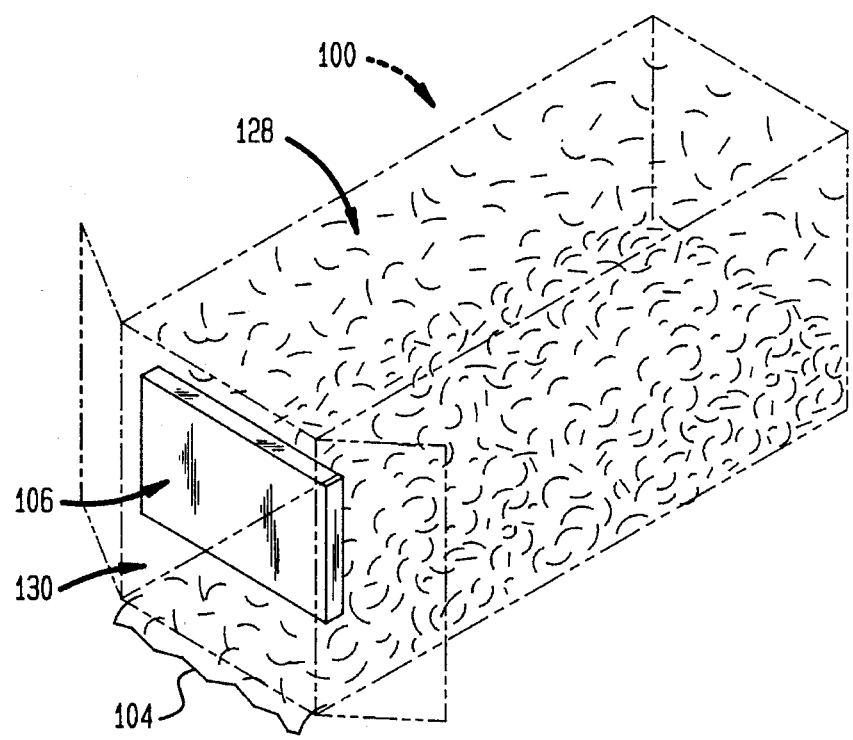
FIG. 3 shows the cargo being discharged from the cargo container.

FIGS. 1–3 illustrate cargo container 100 generally comprising container body 102, liner 104, and bulkhead 106. Generally, container body 102 defines an interior cargo space 110 for holding a cargo; and the container body includes a floor 112, roof 114, front and back walls 116 and 120, and left and right side walls 122 and 124. Back wall 120 includes a pair of outwardly hinged doors 120a and 120b, and when these doors are open, the back wall forms an opening that provides access to the interior of the cargo container. Liner 104 is positioned on container floor 112 in a sequence of overlapping pleats or folded sections 126 that allow the length of the liner to expand; and the bulkhead 106 is secured inside container body 102, immediately forward of back wall 120, to hold a cargo in cargo space 110.

Generally, in operation, a bulk cargo 128 is loaded into cargo space 110 and onto liner 104. Suitable inlet openings (not shown) may be provided in bulkhead 106 to allow the cargo to pass therethrough and into cargo space 110, or the cargo may be conducted into that cargo space through the area above the top of the bulkhead. Once the container is loaded with cargo, it is transported, and the container is unloaded after it reaches its destination.

To unload cargo 128 from container 100, an opening 130 is formed in the bottom of bulkhead 106 and liner 104 is pulled outward from the cargo container. As the liner is so pulled, cargo 128 is pulled out with the liner; and at the same time, the pleats 126 of the liner unfold, expanding the length of the liner. The dimensions of liner 104, particularly the size and number of pleats 126, are selected so that the liner is able to pull out substantially all of the cargo from the container as the liner itself is pulled out of the container cargo. Preferably, as discussed in detail below, a mechanical apparatus is mounted on cargo container 100 to pull liner 104 out therefrom. The cargo falls off the liner out of the back end of the container as the liner is pulled from the container as indicated in FIG. 3.

Any suitable cargo container 100 may be employed in the practice of this invention, although preferably container body 102 has a conventional size and shape. Even more preferably, container body 102 is of the type referred to in the art as intermodal and can be transported by truck, railroad, and ship.

Figure 4:
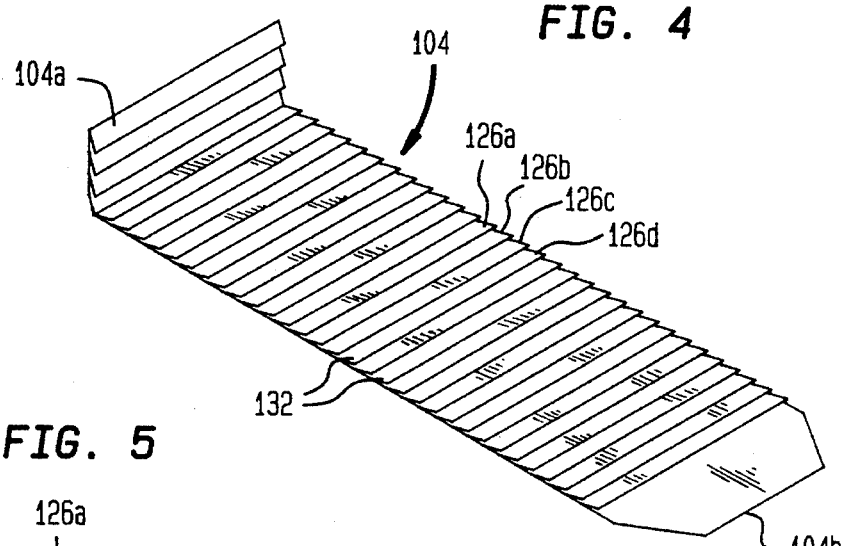
FIG. 4 is a back perspective view of a pleated sheet used to line the floor of the cargo container.
Figure 5:
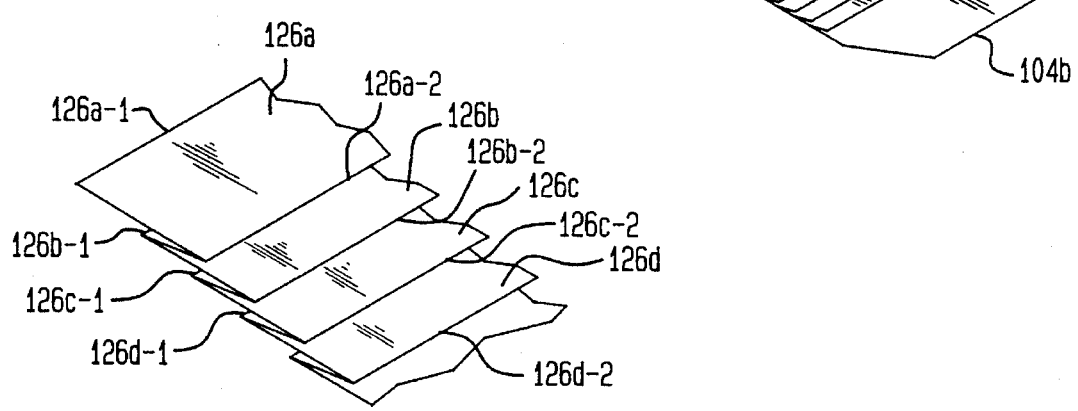
FIG. 5 is an enlarged, perspective view of a portion of the pleated liner of FIG. 4.

FIGS. 4 and 5 illustrate liner 104 in greater detail. With particular reference to FIG. 4, liner 104 has a generally elongated, rectangular shape, including front and back edges 104a and 104b. Also, the folded sections 126 of liner 104 are spaced apart along the length of the liner; and each of the folded sections of the liner extends completely across the width of the liner, substantially perpendicular to the longitudinal axis of the liner. Moreover, over substantially, and preferably over completely, the entire length of the liner, the folds are directed toward the back edge of the liner.

More specifically, each folded section includes front and back edges; and in each pair of adjacent forward and rearward folded sections, the back edge of the forward one of that pair of sections is positioned on top of the rearward one of that pair of sections. For example, in FIGS. 4 and 5, four folded sections are specifically referenced at 126a, 126b, 126c, and 126d. The front and back edges of section 126a are referenced at 126a-1 and 126a-2 respectively, and the front and back edges of section 126b are referenced at 126b-1 and 126b-2 respectively. Similarly, the front and back edges of section 126c are respectively referenced at 126c-1 and 126c-2, and the front and back edges of section 126c are respectively referenced at 126d-1 and 126d-2. The back edge 122a-2 of section 122a is on top of folded section 122b, the back edge 122b-2 of section 122b is on top of folded section 122c, and the back edge 122c-2 of this latter section is on top of folded section 122d.

The number and widths of the folded sections 126 of liner 104 are chosen to help ensure that cargo 128 is completely unloaded from cargo container 100 as the liner is pulled out therefrom. However, each folded section may have a random width, and these folded sections may be randomly spaced along the length of liner 104. That length is another variable that may be selected to help ensure that cargo 128 is completely unloaded from cargo container 100 as the liner is pulled out therefrom; and indeed, preferably, when the liner is installed in the cargo container, the liner extends at least over the complete length of floor 112, and also partially or completely extend over front wall 116. The front portion of liner 104 may be provided with attachment means, such as eyelets or loops to help secure the liner inside cargo container 100; and the back end portion of the liner preferably has truncated corner portions to help pull the liner out of the cargo container, as discussed in greater detail below.

In addition, small heat welds, for example, as shown at 132, may be used to connect together folded sections 126 to maintain those folded sections held against each other inside cargo container 100 until liner 104 is pulled out of the container. Each heat weld has very little resistance and is broken as soon as an appreciable pulling force is applied to the bottom of the two layers joined by the heat weld. Adjacent folded sections may be suitably connected together in other ways, though; and, for example, adjacent sections may be stitched together for this purpose.

Figure 6:
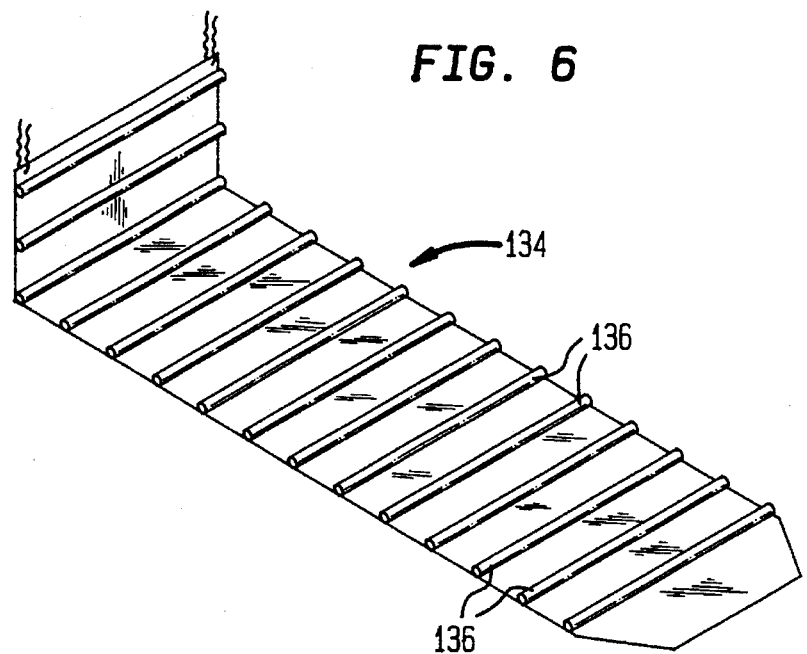
FIG. 6 is a back perspective view of an alternate liner that may be used in the cargo container of FIGS. 1–3.
Figure 7:
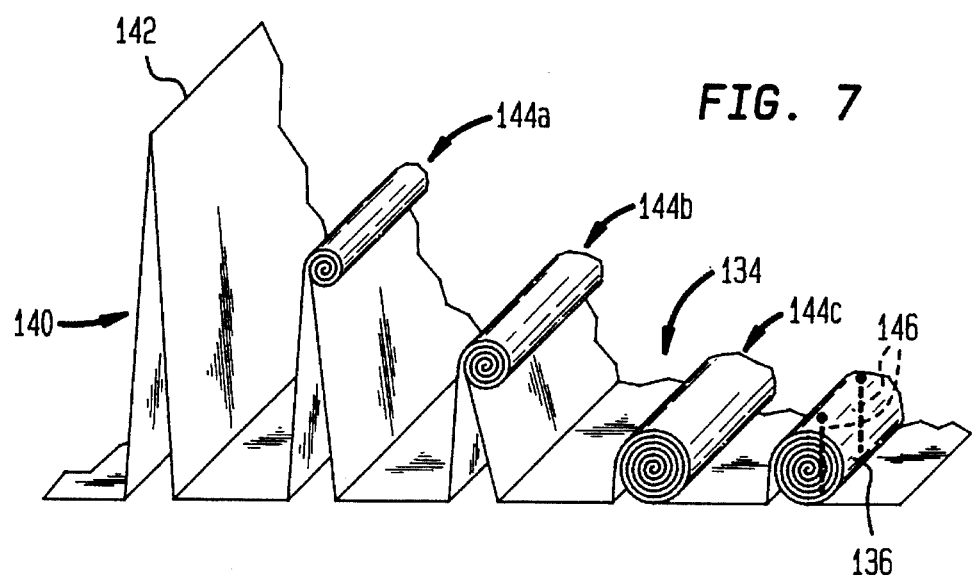
FIG. 7 is an enlarged, perspective view of a portion of the liner of FIG. 6, showing how the rolls of the liner may be formed.
Figure 8:
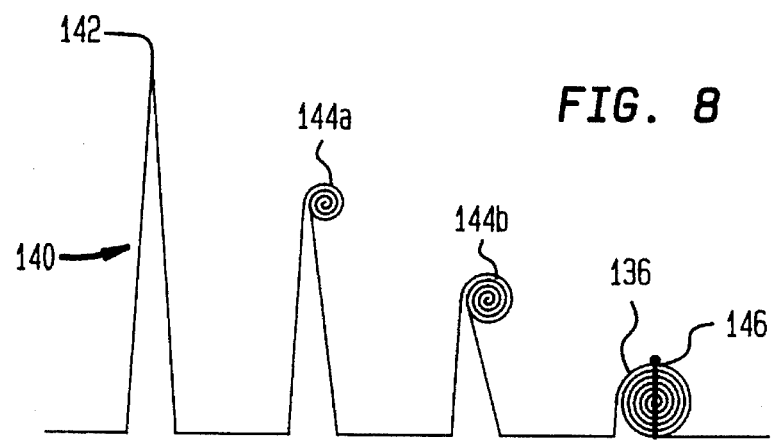
FIG. 8 is a side view of a portion of the liner shown in FIG. 7.

FIGS. 6–8 illustrate an alternate liner 134 that may also be used to pull a bulk cargo from cargo container 100, and that includes a multitude of rolled sections 136, rather than a multitude of overlapping pleats 126, spaced along the liner to allow the length of the liner to expand as it is pulled outward from the cargo container. Each rolled section 136 includes a section of liner 134 rolled about a given axis. Preferably, each rolled section 136 laterally extends completely across the width of liner 134, substantially perpendicular to the longitudinal axis thereof. The specific number of rolled sections 136 in liner 134, and the size of each rolled section may vary, however, depending on the specific application for which a particular liner is intended.

FIGS. 7 and 8 particularly illustrate one procedure that may be used to form rolled sections 136. To form a rolled section, two adjacent portions of liner 132 are brought together, for example as shown at 140, so as to form a top edge 142; and then these two adjacent portions of the liner are progressively rolled together about that edge, as shown at 144a, 144b, 144c, and 144d, until the desired length or amount of material has been rolled together.

Preferably, after a given section of liner 134 has been rolled together, means are applied to the formed roll to hold the material thereof in that roll. For instance, one or more heated pins 146 may be inserted into or through each roll to prevent the material thereof from prematurely unravelling; and preferably, a multitude of such pins are inserted into each roll at a multitude of locations uniformly spaced along the length of the roll. Alternatively, adhesive tape may applied over each roll and connected to adjacent portions of liner 134, on one or both sides of the roll, to prevent the roll from prematurely unravelling.

Both liners 104 and 134 may be made from any suitable material, although preferably the liners have a high resistance to stretching at least along the lengths of the liners. For example, the liners may be constructed of woven polyethylene and polypropylene fabric having a thickness of about seven mils. Alternatively, the liners may be made from strips, such as two inch strips, of fiberglass tape, metal reinforced tape, or polyester reinforced tape, or the liners could be made from coextruded cross-laminated plastic film, or coextruded, or cross laminated film. As still additional examples, the liner may be made from natural materials such as cotton.

As previously mentioned, and with reference again to FIGS. 1–3, bulkhead 106 is secured inside cargo container 100, immediately forward of back wall 120, to hold a cargo in cargo space 110. In particular, the bulkhead is used to hold the cargo in that space both while the cargo is being loaded thereinto and while the container is being transported. As will be understood by those of ordinary skill in the art, typically, a discharge opening must be formed in the bulkhead to allow cargo to be discharged from the cargo container. In order to achieve a complete unloading of the cargo when cargo is discharged from container 100 by means of a procedure in which a bottom liner is pulled out from the container, it is important that a wide opening be formed across the bottom of the bulkhead.

Heretofore, however, it has been difficult to form suitable wide openings in the bottoms of bulkheads of the general type used to hold bulk cargo in cargo containers. This is because these prior art bulkheads have been supported by the floors of the cargo containers; and any very wide opening formed in the bottom of such a bulkhead weakens the bulkhead, and the bulkhead may partially collapse and interfere with the flow of the product outward from the cargo container.

In accordance with one aspect of the present invention, these prior art difficulties are overcome by suspending bulkhead 106 inside cargo container 100—that is, the bulkhead is supported by a portion of the cargo container other than floor 112 thereof, and for example, the bulkhead may be supported by the sides 122, 124, by the roof 114, or by both the sides and the roof of the cargo container. In this way, an opening may be formed completely across the bottom of the bulkhead, or a bottom portion of the bulkhead may be removed, to allow cargo to be discharged from the cargo container without significantly interfering with the way in which the bulkhead is supported inside the cargo container.

Figure 9:
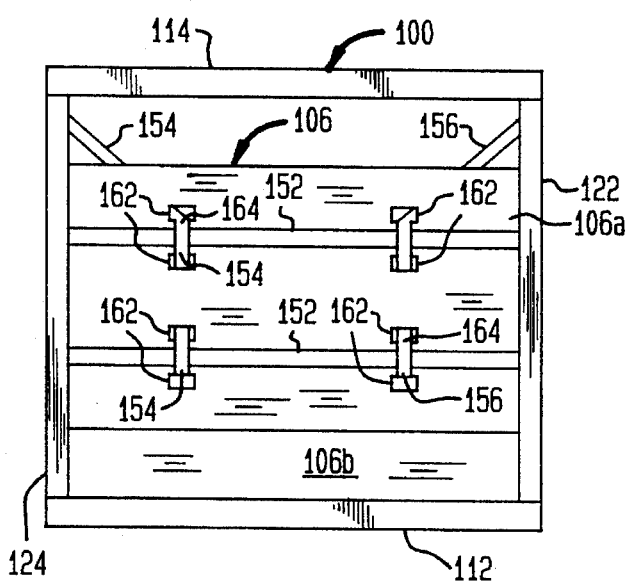
FIG. 9 is a back view of the bulkhead used in the cargo container of FIGS. 1–3, and shows one arrangement for suspending the bulkhead inside the cargo container.
Figure 10:
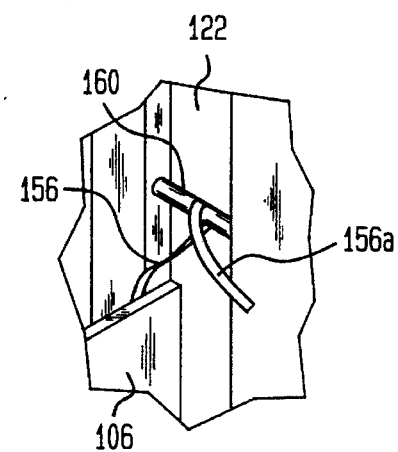
FIG. 10 illustrates how a support strap for the bulkhead may be mounted on the cargo container.
Figure 11:
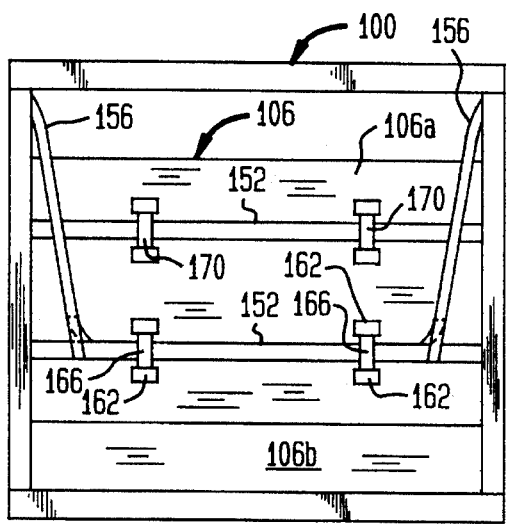
FIG. 11 shows an alternate arrangement for suspending the bulkhead inside the cargo container.
Figure 12:
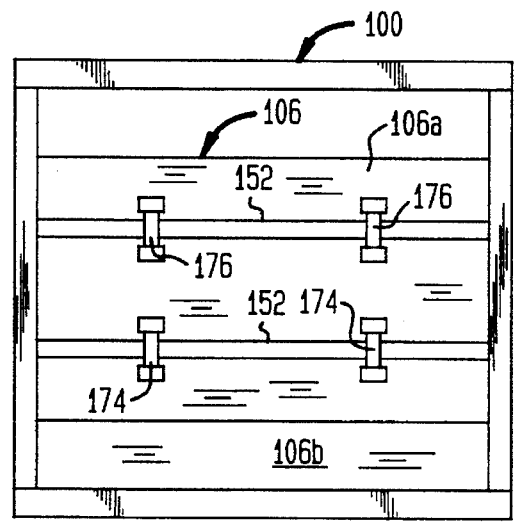
FIG. 12 shows a third arrangement for suspending the bulkhead inside the cargo container.
Figure 13:
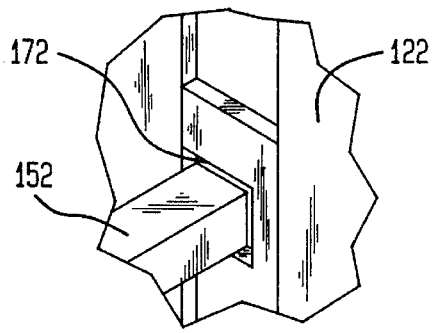
FIG. 13 illustrates how a reinforcing bar for the bulkhead may be supported inside the cargo container.

FIGS. 9–13 illustrate a preferred embodiment of bulkhead 106 and various arrangement for suspending the bulkhead inside cargo container 100. FIGS. 9, 11, and 13 also show a pair of reinforcing members or bars 152 that are mounted inside cargo container 100 to reinforce bulkhead 106. More specifically, reinforcing bars 152 are located rearward of bulkhead 106, extend laterally across the bulkhead, and engage both the bulkhead and the cargo container body to transfer loads on the bulkhead to the cargo container body.

With the support arrangements shown in FIGS. 9–11, at least one and preferably two straps 154, 156 are connected to upper portions of cargo container 100 and used, either directly or indirectly, to suspend bulkhead 106 therewithin. For example, with particular reference to FIGS. 9 and 10, a first end of each strap, for example end 156a of strap 156, may be looped over a hook or bar 160 mounted on an inside surface of cargo container 100, and a second end of each strap may be inserted through one or more slits 162 formed in the bulkhead. The ends of each strap may be tied or connected together, forming one large loop from strap 154 and one large loop from strap 156 to mount the bulkhead on the cargo container. Alternatively, each end of each strap 154, 156 may be tied to a respective adjacent portion of the strap, forming top and bottom smaller loops on strap 154, and top and bottom smaller loops on strap 156 to mount the bulkhead on the cargo container. As a still further alternative, each strap end may be tied to a respective portion of cargo container 100, or to a respective hook or bar mounted on the inside surface of the cargo container, to hold bulkhead 106 thereon.

As will be appreciated by those of ordinary skill in the art, numerous other procedures may be used to connect straps 154, 156 to cargo container 100 and to bulkhead 106, and for instance, the straps may be stapled to the bulkhead. Further, straps 154, 156 may be employed to hold reinforcing bars 152 in place; and for example, as generally depicted in FIG. 9, each strap 154 and 156 may be wrapped or looped around, or simply extend over a respective one side of each of the bars 152, for instance as shown at 164, to hold those bars.

FIG. 11 illustrates a technique for using straps 154, 156 to indirectly suspend bulkhead 106. With this procedure, one of the reinforcing bars 152, for example the lower of these two bars, is directly suspended by straps 154 and 156, and then a second set of straps, referenced at 166, are mounted on or wrapped around that one reinforcing bar and used to suspend bulkhead 106. More particularly, straps 154, 156, preferably the lower ends 154b, 156b thereof, are looped around, wrapped around, or otherwise connected to one of the reinforcing bars, preferably to sides thereof, to hold the reinforcing bar in place. Similarly, each of straps 166 is looped or wrapped around or otherwise mounted on the one reinforcing bar and connected to bulkhead 106. These straps 166 may be connected to bulkhead 106 in any suitable way; and for example, ends of straps 166 may be inserted through slits 162 and tied together on the front side of the bulkhead. Alternatively, straps 166 may be stapled or glued to the bulkhead. With this general procedure, a third set of straps 170 may be connected to or mounted on bulkhead 106 and looped or wrapped around the second of the reinforcing bars to hold that bar in its desired position adjacent the bulkhead.

FIGS. 12 and 13 illustrate another procedure for suspending bulkhead 106 from one or both of the reinforcing bars 152. In this case, however, the ends of that one or both of the reinforcing bars extend into small recesses or notches (one of which is shown at 172 in FIG. 13) formed in the side walls 122, 124 of cargo container 100, and are thus directly supported by those side walls, rather than by straps 154, 156. In the event that only one of the reinforcing bars 152 is supported in notches 172, a set of straps 174 is wrapped or looped around that reinforcing bar and connected to bulkhead 106 to suspend the bulkhead from that reinforcing bar. A second set of straps 176 may be connected to bulkhead 106 and wrapped or looped around the second reinforcing bar to hold that bar in place. In the event that both reinforcing bars 152 extend into receiving notches 172 in the side walls of cargo container 100, a set of straps is mounted on either of those bars and connected to the bulkhead to support the bulkhead; and if desired, a second set of straps may be mounted on the other of the reinforcing bars and also connected to the bulkhead to further support the bulkhead.

Straps 154, 156, 166, 170, 174 may be made of any suitable material, although preferably they are made from a high strength material. For instance, the straps may be constructed of woven polyethylene and polypropylene, or the straps may be made from strips of fiberglass tapes, metal reinforced tapes, or polyester reinforced tapes. As still additional examples, the support straps 154, 156, 166, 170, 174 may be made from coextruded cross laminated plastic film, or coextruded, or cross laminated film.

Preferably, bulkhead 106 is comprised of upper and lower separable sections 106a and 106b; and in use, the lower section of the bulkhead is separated and removed from the upper section to form a discharge opening or outlet in the bulkhead. Bulkhead sections 106a and 106b may be releasably connected together in any suitable manner; and for example, these bulkhead sections may be stapled or nailed together. Alternatively, one of these bulkhead sections may be provided with a plurality of hooks, and the other of the bulkhead sections may be provided with a plurality of openings or eyelets adapted to mount onto those hooks to connect the two bulkhead sections together. As will be understood, it is not necessary that the bulkhead be comprised of separable sections; and for instance, the bulkhead may be formed from one piece or section of material, and a lower portion or area of the bulkhead may be cut away from an upper portion thereof to form the desired discharge opening in the bulkhead.

Preferably, bulkhead 106 is made from a corrugated cardboard material, and is provided with suitable openings or suitable score lines to facilitate the formation of suitable openings, to allow material to be loaded into the cargo container through the bulkhead. The bulkhead may be made of any other suitable material, though; and, for instance, the bulkhead may be made from wood. Moreover, reinforcing bars 152 are preferably made from a metal, although these bars may be made from other materials such as wood.

Figure 14:
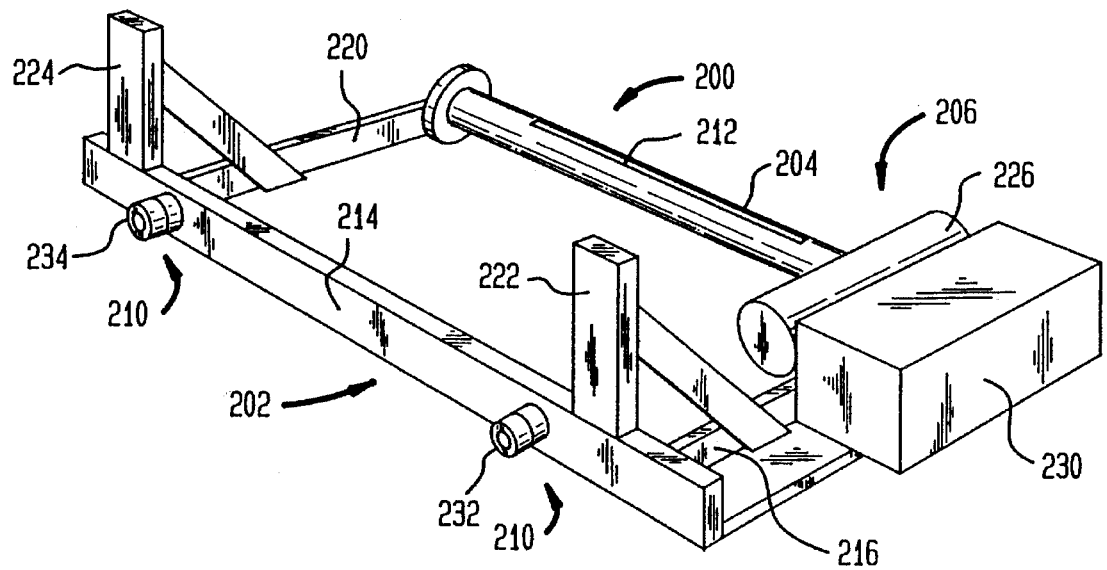
FIG. 14 is a perspective view of an apparatus for pulling a floor liner from the cargo container of FIGS. 1–3.
Figure 15:
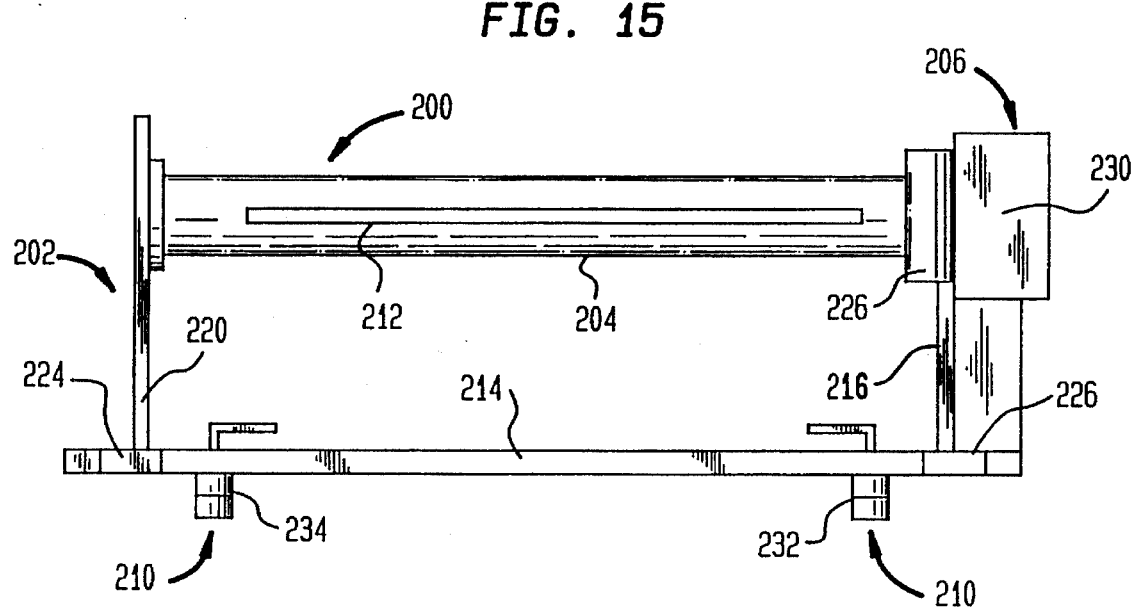
FIG. 15 is a top view of the pulling apparatus of FIG. 14.

FIGS. 14 and 15 illustrate an apparatus 200 for pulling liner 104 outward from cargo container 100; and, generally, this apparatus comprises frame 202, mandrel 204, drive means 206, and connecting means 210. Connecting means 210 is mounted on frame 202 to connect unloading apparatus 200 to cargo container 100, preferably immediately rearward of and below the bottom edge of the back opening thereof. Mandrel 204 is rotatably supported by and laterally extends across frame 202 and includes means 212 to connect liner 104 to the mandrel, and drive means 206 is mounted on the frame and engages the mandrel to rotate the mandrel to wind the liner therearound and, thereby, to pull the liner outward from cargo container 100.

More specifically, frame 202 includes main transverse beam 214, left and right side beams 216 and 220, and left and right stabilizing members 222 and 224. Transverse beam 214 is adapted to extend laterally across cargo container 100, immediately adjacent or slightly below the bottom edge of the back opening thereof. Left and right side beams 216 and 220 are connected to and extend rearward from the left and right sides, respectively, of beam 214, and mandrel 204 is rotatably supported by and laterally extends between the left and right side members.

In use, as liner 104 is wound around mandrel 204, apparatus 200 may tend to pivot upward about main transverse beam 214, and stabilizing members 222 and 224 are provided to limit or to prevent such pivoting movement. In particular, left and right stabilizing brackets 222 and 224 are connected to and extend upward from the left and right sides of beam 214, respectively; and in case apparatus 200 tends to pivot upward about transverse beam 214, those stabilizing brackets engage or abut against the left and right back sides of cargo container 100, preventing further such pivoting movement and thereby stabilizing frame 202 and the entire unloading apparatus 200 during the unloading process.

The various members or elements of frame 202 may be made of any suitable material and can be connected together in any suitable way. For instance, these elements may be made from a metal and welded or bolted together.

Mandrel 204 is rotatably mounted on frame 202; and more specifically, the mandrel is rotatably supported by and laterally extends between side beams 216 and 220 of the frame. To pull a liner 104 from cargo container 100, the back end of that liner is connected to mandrel 204, and then the mandrel is rotated to wind the liner onto and around the mandrel 204. To facilitate connecting liner 104 to the mandrel, the mandrel preferably includes an axially extending slot 212 that radially extends completely through the mandrel; and with particular reference to FIGS. 4 and 14, to connect liner 104 to mandrel 204, the back edge 104b of the liner is pulled through slot 212, and then the mandrel is rotated to wind the liner onto the mandrel. Since the front end of the liner 104 FIG. 1 is unattached, or detachably connected to a position on the front wall 106 of the container 100 the entire liner eventually winds onto the mandrel and thus unloads the entire cargo from the cargo container. The cargo obviously falls off the liner out of the back end of the container as the liner winds onto the mandrel.

Drive means 206 is mounted on frame 202 and is provided to rotate mandrel 204, and preferably the drive means includes a winch 226 and a motor or engine 230. Winch 226 is mounted on frame 202, specifically left side member 216, and is directly connected to mandrel 204 to rotate the mandrel. Engine or motor 230 is also mounted on frame 202 and is connected to winch 216 to operate that winch. Any suitable winch, motor, or engine may be used in the practice of the present invention.

However, often cargo containers of the general type disclosed in FIGS. 1–3 are transported by trucks or other vehicles that includes a power source, such as a hydraulic pump, an electric battery or an electric generator; and preferably, motor 230 is one that can be operated by the power source on the vehicle that carries the cargo container 100. In particular, if this vehicle has a hydraulic pump, it may be preferred to provide unloading apparatus 200 with a hydraulic motor; while if the transporting vehicle has an electric battery or generator, it may be appropriate to provide apparatus 200 with an electric motor.

Connecting means 210 preferably includes left and right connecting assemblies 232 and 234 mounted, respectively, on the left and right sides of frame 202 to connect the frame, respectively, to left and right sides of cargo container 100. An important advantage of apparatus 200 is that the connecting assemblies 232 and 234 thereof are particularly well adapted to mount apparatus 200 onto an intermodal cargo container having conventional, lower back corner castings spaced apart a standard distance.

Figure 16:
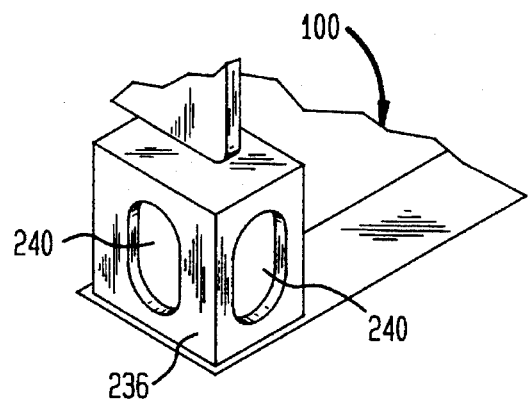
FIG. 16 is a perspective view of a corner casting of the cargo container shown in FIGS. 1–3.

To elaborate, standard intermodal cargo containers of the type shown in FIGS. 1–3 typically have corner members, referred to as corner castings, located at, among other places, the back lower left and back lower right corners of the container body. One corner casting is shown at 236 in FIG. 16; and as illustrated therein, corner castings form a multitude of openings 240 that are used to lock the cargo containers onto supporting members such as trucks or railroad car frames or other containers. Because of the way in which these corner castings are used, industry standards have developed that govern the size, shape, and spacing of the corner castings. In order to make apparatus 200 very easy to mount onto a cargo container having such lower back corner castings, connecting assemblies 232 and 234, first, are specifically designed to lock into corner castings, and second, are spaced apart a distance substantially equal to a standard distance between such corner castings.

Figure 17:
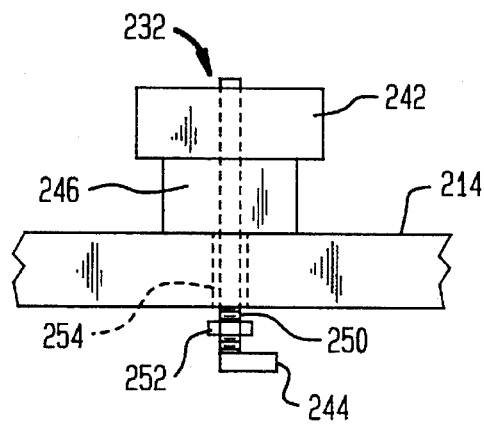
FIG. 17 is a top view of one of the connecting assemblies of the apparatus of FIGS. 14 and 15.
Figure 18:
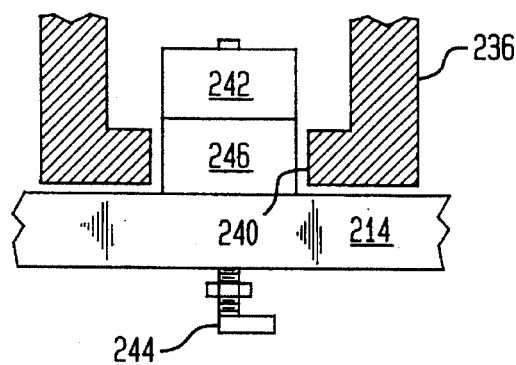
FIG. 18 shows the connecting assembly of FIG. 17 inserted into the corner casting of FIG. 16.
Figure 19:
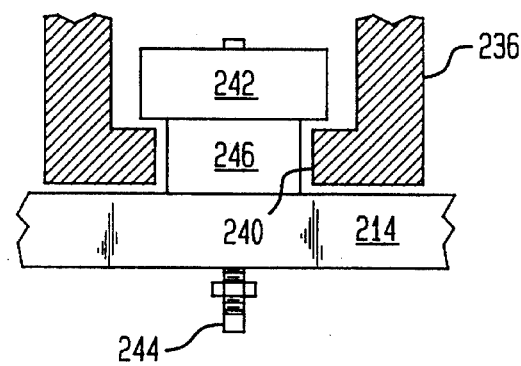
FIG. 19 shows the connecting assembly locked inside the corner casting.

Left and right connecting assemblies 232 and 234 are substantially identical, and thus only one will be described herein in detail. With reference to FIG. 17, each of the connecting assemblies includes twist lock 242, handle 244, spacer 246, support rod 250, and adjusting nut 252. Twist lock 242 is rotatably mounted on frame 202, specifically transverse beam 214, adjacent one end thereof; and handle 244 is connected to the twist lock to pivot that lock to facilitate inserting the twist lock into, and then locking it inside, one of the corner castings of cargo container 100. More specifically, twist lock 242 is pivotal between, and handle 244 is used to pivot the twist lock between, first and second positions shown in FIGS. 18 and 19, respectively. In this first position, twist lock 242 can be inserted through an opening 240 in, and into the interior of, corner casting 236; and in the second position, twist lock 242 is locked inside corner casting 236. Preferably, as illustrated in the drawings, twist lock 242 is disposed on a forward or front side of beam 214, and handle 244 is disposed on a rearward or back side of that beam.

Twist lock 242 may be pivotally mounted on beam 214 and handle 244 may be connected to the twist lock in any suitable way. For example, a through opening 254 may be formed in beam 214, and rod 250 may be inserted through that opening such that the rod is supported by beam 214 and is rotatable in opening 254. At the same time, twist lock 242 is rigidly mounted on a forward end of rod 250, and handle 244 is connected to a back end of rod 250.

Spacing member 246 is connected to transverse beam 214, between that beam and twist lock 242, to maintain the twist lock spaced from the transverse beam. This facilitates inserting the twist lock into the interior of corner casting 236 and locking the twist lock therein. As shown in FIG. 17, preferably, support rod 250 also extends through spacing member 246.

Figure 20:
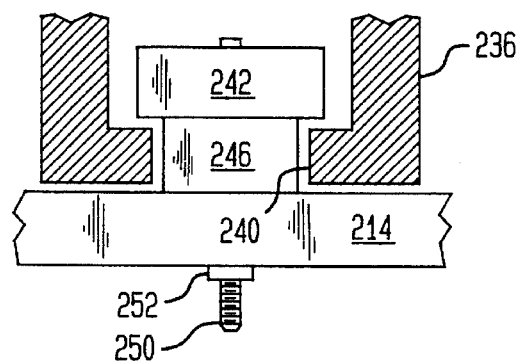
FIG. 20 shows the connecting assembly tightly clamped onto the corner casting.

Preferably, each connecting assembly 232 and 234 also includes tightening means connected to the twist lock to pull the twist lock toward transverse beam 214 and thereby to connect frame 202 tightly to a respective one of the corner casting members on container 100. With the embodiment of connecting assembly 232 illustrated in the drawings, this tightening means comprises adjusting nut 252, which is threadably mounted on rod 250, rearward of beam 214. In operation, once twist lock 242 is locked inside corner casting 236, nut 252 is threaded forward on rod 250 to bring the nut into engagement with the backside of beam 214 and then to pull rod 250 and twist lock 242 rearward, thereby clamping the corner casting securely between twist lock 242 and beam 214, as shown in FIG. 20.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. An unloading apparatus for use with a cargo container defining an interior cargo space comprising:

the cargo container having at least a floor, left and right side walls on either side of the floor, a front wall at a first end of the floor between the side walls and a back opening at a second end of the floor opposite the first end of the floor and between the side walls, a liner disposed over said floor between at least the front wall and back opening, an unloading apparatus including:

a frame with a left and right side, a connecting assembly located on the left side of the frame and a connecting assembly located on the right side of the frame, wherein the second end of the floor has a left side and a right side with a first opening on the left side of the second end of the floor and a second opening on the right side of the second end of the floor, and wherein the connecting assembly has on the left side of the frame a left twist lock mechanism and on the right side of the frame a right twist lock mechanism beth rotatably attached and positioned so that the left and right twist lock mechanisms can be inserted into the left and right openings respectively and locked in the respective left and right openings respectively, a mandrel rotatably supported by and laterally extending from the left side to the right side of the frame and including means to connect a first end of the liner adjacent the back opening to the mandrel, drive means mounted on the frame and engaging the mandrel to rotate the mandrel so that the liner winds around the rotating mandrel, and wherein winding the liner around the mandrel pulls the liner across the floor towards the mandrel over the floor outward from the container to unload a cargo previously deposited on top of the liner within the interior cargo space, as the liner winds onto the mandrel the cargo on the liner falls out of the back opening of the container, and the cargo is completely unloaded when the entire liner has been wound onto the mandrel; and wherein the liner has means to allow a length of the liner to expand as the mandrel pulls the liner across the floor; and a bulkhead with an opening in a bottom portion and located forward of an adjacent the back opening;

means connected to the container body and to the bulkhead, and suspending the bulkhead inside the container body said cargo passing through said bottom opening.

2. An unloading apparatus according to claim 1, wherein the means to connect the liner to the mandrel includes a slot axially extending along and radially extending through the mandrel.

3. Unloading apparatus according to claim 1 wherein: the left twist lock mechanism further comprises a left handle connected to the left twist lock to pivot the left twist lock to facilitate inserting the left twist lock into, and locking the left twist lock in, the left side of the cargo container; and the right twist lock mechanism further comprises:

a right handle connected to the right twist lock to pivot the right twist lock to facilitate inserting the right twist lock into, and locking the right twist lock in, the right side of the cargo container.

4. An unloading apparatus according to claim 1, wherein:

the frame includes a main transverse beam having front and back sides, and adapted to extend laterally across the cargo container adjacent the back opening thereof;

the left and right twist lock mechanism are located on the front side of the transverse beam; and left and right handles are located on the back side of the transverse beam.

5. An unloading apparatus according to claim 1, wherein:

the left and right twist lock mechanism are supported for limited movement toward and away from the frame;

the left connecting assembly further includes tightening means connected to the left twist lock to pull the left twist lock toward the frame and to connect the frame tightly to the left side of the cargo container; and the right connecting assembly further includes tightening means connected to the right twist lock to pull the right twist lock toward the frame and to connect the frame tightly to the right side of the cargo container.

6. An unloading apparatus according to claim 1 wherein the frame further comprises:

a main transverse beam adapted to extend laterally across the frame from the left to the right side thereof, adjacent the back opening of the cargo container;

a left stabilizing bracket connected to and extending upward from the transverse beam; and a right stabilizing bracket connected to and extending upward from the transverse beam;

wherein the left and right stabilizing brackets are adapted to abut against the left and right sides, respectively, of the cargo container as the mandrel pulls the liner outward therefrom.

7. An unloading apparatus according to claim 1, wherein the drive means includes an electric motor.

8. An unloading apparatus according to claim 7, wherein the drive means' motor includes a 12 volt DC electric motor.

9. An unloading apparatus according to claim 1, wherein said apparatus is adapted to unload at least 40,000 pounds of cargo from the cargo container in approximately 15 minutes.

10. An unloading apparatus according to claim 1 wherein the means to allow the length of the liner to expand comprises one or more overlapping pleated sections.

11. An unloading apparatus according to claim 1 wherein the means to allow the length of the liner to expand comprises one or more rolled sections.

12. An unloading apparatus according to claim 1 further comprising;

a reinforcing bar secured inside the container body and extending laterally across the bulkhead and rearward thereof, the reinforcing bar engaging both the bulkhead and container body to transfer loads on the bulkhead to the container body.

* * * * *